Figure 1:
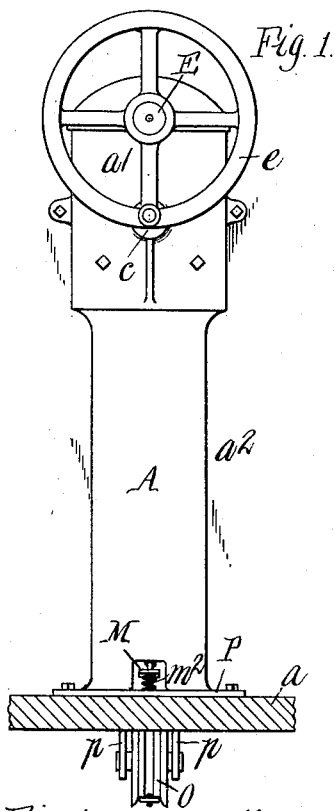

G. S. ACKLEY.
BRAKE MECHANISM.
APPLICATION FILED OCT. 13, 1910.

1,002,551.

Patented Sept. 5, 1911.

2 SHEETS—SHEET 1.

Witnesses.
A. G. Dimond.
C. H. Bund.

Inventor.
Griffin S. Ackley,
By Wilhelm, Parker & Ward,
Attorneys.

G. S. ACKLEY.
BRAKE MECHANISM.
APPLICATION FILED OCT. 13, 1910.

1,002,551.

Patented Sept. 5, 1911.

2 SHEETS—SHEET 2.

Witnesses.
A. G. Dimond.
C. H. Bund.

Inventor
Griffin S. Ackley,
By Wilhelm, Parker & Hart,
Attorneys.

UNITED STATES PATENT OFFICE.

GRIFFIN S. ACKLEY, OF BUFFALO, NEW YORK.

BRAKE MECHANISM.

1,002,551.   Specification of Letters Patent.   Patented Sept. 5, 1911.

Application filed October 13, 1910. Serial No. 586,820.

*To all whom it may concern:*

Be it known that I, GRIFFIN S. ACKLEY, a citizen of the United States, residing at Buffalo, in the county of Erie and State of New York, have invented a new and useful Improvement in Brake Mechanisms, of which the following is a specification.

This invention relates more particularly to that type of brake mechanisms for cars in which a hand-actuated vertical handle or wheel is employed which operates a drum upon which the brake chain is wound.

In the construction and operation of cars, especially vestibuled street cars, it is desirable to limit as much as possible the space in the end of the car required by the motorman or driver in operating the same. The common form of brake mechanism now in use, in which the winding drum is placed beneath the floor of the car and is operated by a vertical brake staff which extends up through the floor and is provided at its upper end with a horizontally rotatable crank handle or wheel for turning the same, has been found undesirable as the handle, when of proper length to give sufficient purchase or leverage to the operator, requires considerable space in the end of the car to permit of the free turning thereof. There is also the danger that these handles, when the brake mechanism is suddenly released, will fly back and injure the operator or a passenger standing near. It has been attempted to overcome this difficulty by providing the upper end of the brake staff with a vertically rotatable hand-wheel or handle which is geared to the staff and operates the same for turning the winding drum. The difficulty with this construction is that it is impossible in a practical construction to so construct and arrange the connecting gears that repeated turns of the hand-wheel will not be necessary in applying the brakes. This increases the labor required in operating the hand-wheel and prevents that quick application of the brakes which is frequently of prime importance in operating a car. It has also been found in use that vertical wheel brakes of this kind, owing to the friction between their various connecting gears, are very slow in releasing, and to effect a quick release of these brakes powerful springs are required to pull the brake beams back away from the wheels. These springs materially increase the power required in applying the brakes and add considerably to the cost of the brakes and of the installation thereof on the cars.

A further difficulty has been frequently experienced in finding room for the winding drum beneath the platform of the car, and its location there in many instances has required extensive alterations to be made in the structure and arrangement of the various parts which are usually secured beneath the floor of the car. This adds greatly to the cost of equipment and prevents the brakes from being universally applicable to all styles of cars.

This invention is designed to overcome these difficulties by providing a brake mechanism of the vertical handle or wheel type, of simple, economical and compact construction, which will occupy a relatively small space at the end of the car; which can be readily installed in the car without requiring any changes or alterations therein and at little expense; which can be quickly and effectively operated for applying the brakes to the wheels and will act to quickly release the brakes when the handle and drum are released; and in which no brake staff is employed and the chain winding drum is located above the floor of the car adjacent to the operating handle or wheel, leaving the space below the car floor practically unobstructed and available for use for other purposes.

Another object of this invention is to provide a winding drum upon which the brake chain may be wound with equal facility in either direction and the peripheral winding surface of which is so shaped that the rotation of the drum in either direction increases the leverage on the chain as the drum rotates, and to construct the operating mechanism for the drum in such a manner that it can be changed with little trouble so as to rotate the drum in either direction in applying the brakes. The brake mechanism can thus be readily adapted for use with operating handles or wheels which turn either to the left or to the right in applying the brakes.

Another object of this invention is to provide a frame or casing in which all of the parts of the brake mechanism are mounted and which forms therewith a unitary structure which can be readily secured as such in position in the car with all the mechanism in operative position therein, and to construct the casing so that it will inclose all of the mechanism which is located above the floor of the car, protecting the same from dust and dirt and giving a sightly appearance thereto.

A further object of this invention is to generally improve the construction and arrangement of the brake mechanism and the parts thereof in the respects hereinafter more fully described and claimed.

Figure 2:
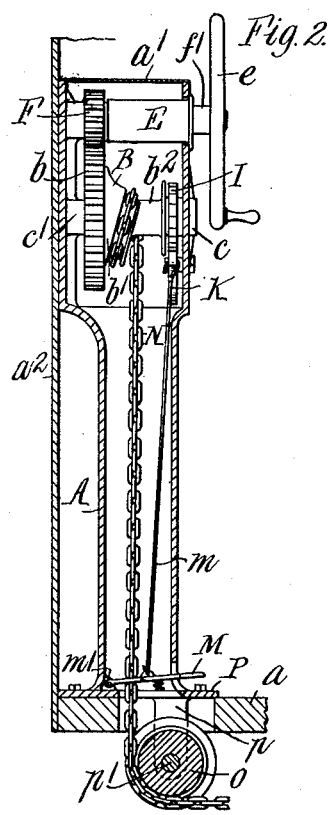
Figure 3:
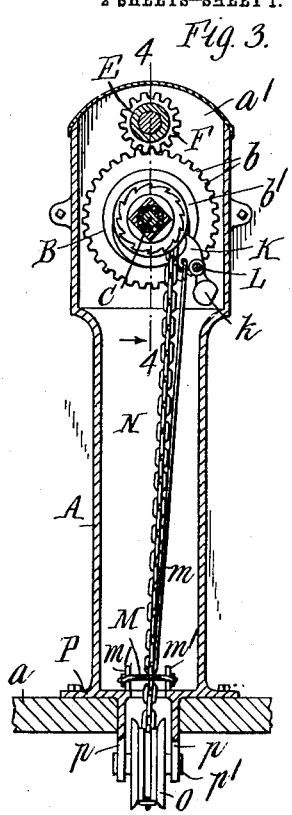
Figure 4:
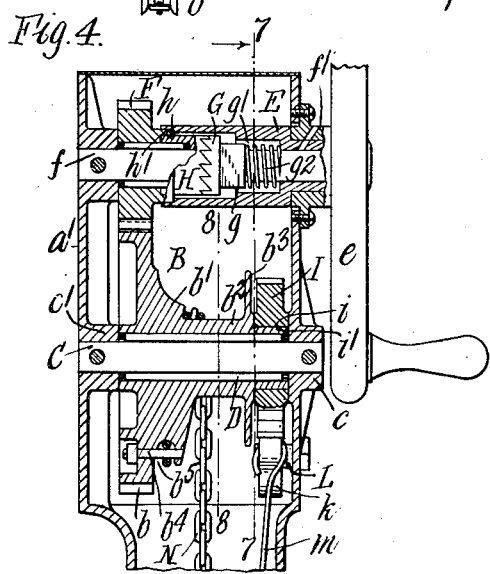
Figure 5:
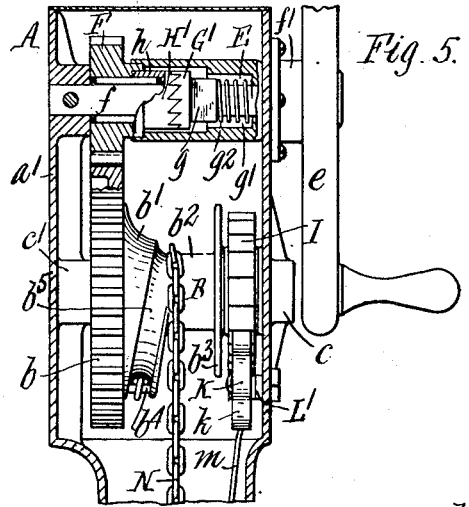
Figure 6:
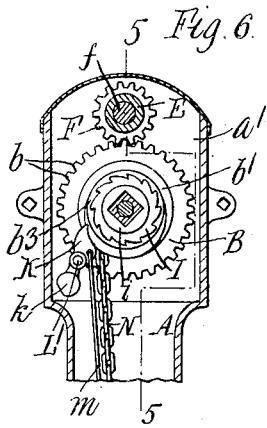
Figure 7:
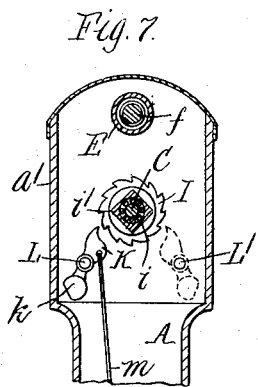
Figure 8:
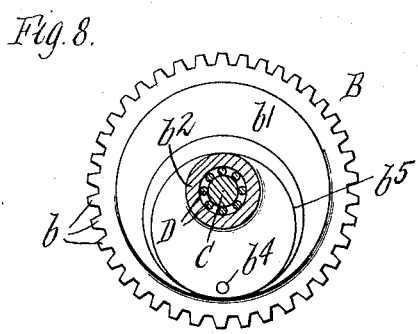
Figure 9:
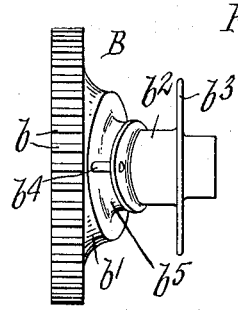
Figure 10:
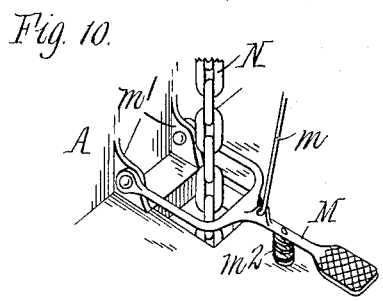
Figure 11:
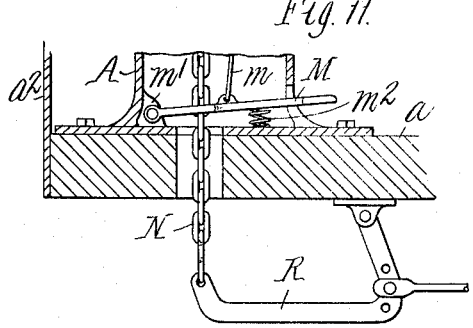

In the accompanying drawings, consisting of two sheets: Figure 1 is a front elevation, partly in section, of a brake mechanism embodying the invention. Fig. 2 is a sectional side elevation thereof. Fig. 3 is a sectional front elevation thereof with hand-wheel and front wall of the casing removed. Fig. 4 is a fragmentary sectional elevation, on an enlarged scale, on line 4—4, Fig. 3. Fig. 5 is a fragmentary sectional elevation, on an enlarged scale, on line 5—5, Fig. 6. Fig. 6 is a fragmentary sectional elevation of a brake mechanism adapted to be turned in a direction opposite to that shown in Fig. 3. Fig. 7 is a sectional elevation on line 7—7, Fig. 4. Fig. 8 is a sectional elevation of the winding drum on line 8—8, Fig. 4. Fig. 9 is a side elevation of the winding drum detached. Fig. 10 is a fragmentary perspective view, on an enlarged scale, of the foot lever and adjacent parts. Fig. 11 is a fragmentary sectional elevation of the lower portion of a brake mechanism of modified construction.

Like reference characters refer to like parts in the several figures.

The brake mechanism in general terms comprises a horizontal operating shaft having a vertically rotatable handle or wheel at one end, a pinion at its opposite end and a clutch connecting the handle with the pinion which permits the handle to turn freely in one direction without turning the pinion, and a chain winding drum which is journaled on an axis parallel with and adjacent to the operating shaft and geared to the pinion thereon. A brake chain is secured to the drum and extends downwardly through the floor of the car and is connected at its lower end either directly to the brake rod or to some intermediate lever or other connection for operating the brakes. The drum has a peripheral winding surface upon which the brake chain can be wound in either direction and which is so shaped as to increase the leverage on the chain as the drum rotates. The drum is also provided with suitable holding means which can be actuated for preventing the drum from unwinding when the brake is being applied. The various parts of the mechanism are so constructed and arranged that they can be readily adapted for either a right handed or a left handed operating handle, i. e., a handle which turns either to the right or to the left in applying the brake. And the entire mechanism is mounted in and inclosed by a suitable frame or casing which rests upon the floor of the car adjacent to the end or dash thereof where the mechanism will take up as little room as possible and the operating handle will be easily accessible to the operator of the car.

Referring now to the particular construction shown in the drawings, A represents the supporting casing or frame in which the winding drum and its operating mechanism are mounted. This casing may be of any suitable construction and secured to the car in any desirable manner. The casing shown in the drawings is of pedestal shape having its base resting upon and secured to the floor $a$ of the car, and an enlarged upper end or head $a'$ in which the winding drum and operating mechanism are mounted and which is bolted or otherwise firmly fastened to the dash or end $a^2$ of the car. A frame of this construction affords a firm and substantial support for the brake mechanism and at the same time incloses and protects the parts thereof from dust and dirt and gives a neat appearance to the mechanism.

B represents the winding drum for the brake chain. This drum may be of any suitable construction which has a peripheral winding portion shaped so as to take up the slack in the brake chain and increase the leverage on the chain as the drum is rotated. The drum shown is of this character and has the additional advantage that it will operate effectively to wind the brake chain thereon in whichever direction it is rotated. This drum has an enlarged circular portion at one end provided with suitable gear teeth $b$ and adjacent to this has a peripheral winding portion $b'$ which is eccentric to the axis of the drum, and a smaller concentric portion $b^2$ which terminates in a radial flange $b^3$. That part of the eccentric portion $b'$ which is of greatest distance from the axis of the drum is provided with a pin or other connection $b^4$ for securing the brake chain thereto, and pepheral grooves or channels $b^5$ $b^5$ of decreasing radius extend spirally in opposite directions from the pin or connection $b^4$ and terminate in the concentric portion $b^2$ of the drum. When the drum is turned in either direction the chain will be wound spirally upon the drum, following along one of the grooves $b^5$ until the small concentric portion of the drum is reached and then winding thereon.

The eccentric portion of the drum serves to quickly take up any slack in the chain when the drum is rotated in either direction and at the same time increases the leverage on the chain as the drum rotates until the chain reaches the smaller concentric portion of the drum where the drum exerts its greatest leverage upon the chain. The drum will thus operate effectively and take up the slack and apply the brakes when rotated in either direction.

While a drum of the character described possesses especial advantages when used in connection with the brake mechanism shown, its use is not so limited and it may be employed with advantage in various other forms of brake mechanism where a winding drum is desired which can be rotated in either direction for winding the chain.

The drum B may be mounted in the casing A in any suitable manner. In the construction shown the drum is journaled in a fixed axle C which is secured at its ends in suitable bosses $c$ $c'$ in the front and rear walls of the casing. The drum is preferably provided with a roller bearing D for facilitating its freedom of movement on the axle.

E represents the horizontal operating shaft which projects through the front wall of the casing A and is provided at its outer end with a suitable handle or wheel $e$ which is adapted to rotate in a vertical plane, and at its inner or rear end with a pinion F which engages the teeth $b$ of the winding drum for turning the same. The shaft and pinion may be journaled in the casing and connected together in any suitable manner.

In the construction shown the pinion F is journaled on a stud axle $f$ which is secured at its inner end to the rear wall of the casing, and the shaft E is hollow and surrounds the outer end of this axle and is journaled in an annular bearing $f'$ which is secured to the front wall of the casing. On the axle $f$ within the inner end of the shaft E are loosely journaled clutch members G and H which are of the usual ratchet type. The member G is movable endwise of the shaft E and has a square end portion $g$ which engages in a square socket $g'$ in the shaft E so that the clutch member and shaft turn together, and the clutch member H has a similar square end portion $h$ which engages in a square socket $h'$ in the pinion F and turns therewith. A spring $g^2$ on the axle $f$ serves to hold the clutch members normally in engagement with each other.

The clutch members described are those shown in Fig. 4 of the drawings and are adapted to be used for connecting the shaft to the pinion when the chain winding drum is to be rotated for applying the brakes by turning the shaft operating handle or wheel to the right, in other words, in a right handed brake mechanism. When the drum is intended to be rotated for applying the brakes by turning the operating handle to the left, i. e., in a left handed brake mechanism, clutch members G' and H', shown in Fig. 5, are employed which are similar to the members G and H except that their engaging ratchet teeth face in opposite directions. Either set of clutch members can be easily removed from the axle $f$ upon withdrawing the operating shaft, and replaced by the other set to change the direction of the winding movement of the shaft.

The holding means for the winding drum in the construction shown consists of a ratchet wheel I which is secured to the front end of the drum to turn therewith, preferably having a square hole $i$ which fits over a square extension $i'$ on the drum between the flange $b^3$ and the front wall of the frame. This wheel is alike on both sides so that it can be reversed and secured to the drum with its teeth facing in either direction. In the right hand brake mechanism, shown in Figs. 2, 3 and 4, the teeth of the ratchet wheel face to the right, while in the left handed brake mechanism, shown in Figs. 5, and 6, the position of the wheel is reversed and the teeth face to the left.

By locating the ratchet wheel at the front end of the drum and the connecting gears at the rear ends of the drum and operating shaft, a very compact construction is obtained and the depth of the mechanism considerably decreased as the drum and its ratchet in this arrangement take up no more space horizontally between the walls of the casing than that required by the operating shaft and its clutch members, and there is no waste space between the walls on either the operating shaft or the drum.

The ratchet wheel is adapted to be engaged by a suitable reversible holding dog K and pivot posts L L' are provided in the front wall of the casing A at opposite sides of the axis of the ratchet wheel, to either of which the dog K is adapted to be secured, depending upon the direction in which the teeth of the ratchet wheel face. The dog K is provided with a weighted end portion $k$ which holds it normally out of engagement with the teeth of the ratchet wheel and is actuated to engage the ratchet teeth by a foot lever M with which it is connected by a rod $m$. The lever M is located centrally in the lower portion of the casing A at an equal distance from the pivot posts L L' so that the rod $m$ will connect the lever with the dog when the latter is mounted on either post.

The inner end of the lever is forked to straddle the brake chain and is pivoted to lugs $m'$ $m'$ on the rear wall of the casing. The outer end of the lever projects through an opening in the front wall of the casing where it is within easy access of the operator of the car. A spring $m^2$ is placed between the lever and the base of the casing for holding the lever normally in its raised or releasing position.

The holding means and its actuating mechanism above described are desirable as they are simple in construction and can be easily operated and are reversible, but any other suitable holding means and actuating mechanism therefor may be employed, if desired.

N represents the brake chain, which is secured at its upper end to the winding drum by the pin $b^4$ and extends downwardly from said drum through the floor of the car and is adapted to be secured at its lower end either directly to the brake rod or to a brake lever or other movable part which is connected to the brakes and by the movement of which the brakes are operated. In the construction shown in Figs. 1-3, the chain is intended to extend back rearwardly under the car for connection with the brakes, and to permit of the free movement of the chain, a pulley O is provided which is arranged under the car floor beneath the brake mechanism and over which the chain passes.

Any suitable means may be employed for securing the pulley O in position below the floor of the car. In the construction shown the frame A has a base plate P provided with a suitable hole or opening through which the brake chain extends and with depending bearing lugs $p$ $p$ on opposite sides of this opening in which is secured an axle $p'$ upon which this pulley is journaled. This construction permits the pulley to be located so that it will project but a short distance below the floor of the car and affords a very strong and secure support for the pulley. The pulley and chain take up but little space beneath the floor of the car and for this reason can be installed without requiring any changes or alterations to be made and do not interfere with the use of the space below the floor for other purposes.

In Fig. 11 a modification is shown in which the lower end of the brake chain is attached directly beneath the brake mechanism to the end of a goose neck lever R which is pivoted at its opposite end to the floor of the car and to which, intermediate of its ends, the brake rod is attached. As the chain is wound upon its drum the free end of this lever is raised, drawing the brake rod forwardly and applying the brakes.

The brake mechanism can be changed from the right handed mechanism, shown in Figs. 2, 3 and 4, to a left handed mechanism, shown in Figs. 5, and 6, or vice-versa, with little trouble. This is done by removing one set of clutch members from the operating shaft and substituting the other set, reversing the ratchet wheel on the drum and shifting the holding dog from one side of the ratchet wheel to the opposite side thereof. This considerably reduces the cost of manufacture as one connection is available for both mechanisms and it also adds greatly to the usefulness and desirability of the brake mechanism.

The various parts of the mechanism are mounted in the casing in such a manner as to form a unitary structure which can be completed and tested at the factory and can be easily installed in the car without the necessity of fitting or adjusting any parts and without making any alterations or changes in the car. It is only necessary to cut a hole in the floor of the car to receive the brake chain and the depending pulley if the casing is provided with one. The casing can then be set in place, the chain connected, and the base and rear wall of the casing bolted to the floor and dash of the car, all of which can be done with little time and expense. This greatly reduces the cost of installation of the brakes and prevents the trouble which frequently arises in installing brakes from a failure to properly fit and adjust the parts thereof.

The operating shaft and winding drum are arranged adjacent to each other and geared directly together so that no intermediate gears or staff are required and the power exerted on the handle is commuicated directly to the drum with little loss by friction and the drum can be rotated for applying the brakes with comparatively few turns of the operating handle. When the holding dog is thrown out and the operating handle released, the drum will operate to quickly release the brakes. The weight of the brake chain upon the drum is more than enough to overcome what little friction there is between the parts of the mechanism which would tend to oppose the releasing movement of the drum. The winding drum being above the floor of the car leaves the space below the floor available for other purposes and permits the mechanism to be installed in cars in which there is no suitable space below the floor in which the drum can be secured and it would be otherwise necessary to alter the construction and arrangement of the parts of the car below the floor to accommodate the drum.

I claim as my invention:

1. In a brake mechanism, the combination of a horizontal operating shaft provided with a vertical operating handle, a chain winding drum journaled on an axis parallel with and adjacent to said operating shaft above the floor of the car and geared to said shaft, said drum having a peripheral winding portion shaped to increase the leverage on the chain as the drum is rotated, and a brake operating chain connected to said drum and extending downwardly therefrom for connection with the brakes of the car, substantially as set forth.

2. In a brake mechanism, the combination of a horizontal operating shaft, an operating handle therefor, a chain winding drum journaled on an axis parallel with and adjacent to said shaft above the floor of the car, said drum having a peripheral winding portion shaped to increase the leverage on the chain as the drum is rotated, a gearing located at the rear of said drum and said shaft for connecting said drum to said operating shaft, a clutch connecting the operating handle with said gearing, a holding ratchet wheel for said drum arranged at the front end thereof, a holding dog for said ratchet wheel, and a brake operating chain connected to said drum, substantially as set forth.

3. In a brake mechanism, the combination of a casing, a horizontal operating shaft journaled at its ends in said casing and having an operating handle secured to one end thereof without and adjacent to the outer wall of the casing, a chain winding drum geared to said shaft and journaled within said casing with its axis parallel with said shaft above the floor of the car, said drum having a peripheral winding portion shaped to increase the leverage on the chain as the drum is rotated, and a brake operating chain connected to said drum and extending downwardly therefrom for connection with the brakes of the car, substantially as set forth.

4. In a brake mechanism, the combination of a pedestal casing adapted to rest at its base upon the floor of the car, a horizontal operating shaft journaled in said casing and provided with a vertical operating handle, a chain winding drum journaled in said casing on an axis parallel with and adjacent to said shaft above the floor of the car and geared to said shaft, and a brake operating chain connected to said drum and extending downwardly therefrom within said casing for connection with the brakes of the car, substantially as set forth.

5. In a brake mechanism, the combination of a pedestal casing adapted to rest at its base upon the floor of the car, a horizontal operating shaft journaled in said casing and provided with a vertical operating handle, a chain winding drum journaled in said casing on an axis parallel with and adjacent to said shaft above the floor of the car and geared to said shaft, means within said casing for holding said drum against rotary movement in one direction, means for operating said holding means which can be actuated from without said casing, and a brake operating chain connected to said drum and extending downwardly therefrom within said casing for connection with the brakes of the car, substantially as set forth.

6. In a brake mechanism, the combination of a pedestal casing adapted to rest at its base upon the floor of the car, a horizontal operating shaft journaled in said casing and provided with a vertical operating handle, a chain winding drum journaled in said casing on an axis parallel with and adjacent to said shaft above the floor of the car and geared to said shaft, a pulley journaled beneath the floor of the car on a bearing depending from the base of said casing, and a brake operating chain connected to said drum and extending downwardly therefrom within said casing and over said pulley for connection with the brakes of the car, substantially as set forth.

7. In a brake mechanism, the combination of a casing, a chain winding drum journaled therein and adapted to rotate in either direction, means for rotating said drum, a reversible ratchet wheel adapted to be connected with said drum with its teeth facing in either direction, a holding dog for engaging said ratchet wheel to hold said drum from rotation, said casing being provided with means for pivoting said dog thereon in either of two positions at opposite sides of the axis of said ratchet wheel, a single means for actuating said dog in either of its two positions, and a brake operating chain connected to said drum, substantially as set forth.

8. In a brake mechanism, the combination of a chain winding drum comprising an eccentric portion of relatively large radius and a concentric portion of smaller radius, said eccentric portion having a connection for a brake chain and corresponding peripheral winding portions which decrease in radius in opposite directions from said chain connection to said concentric portion, whereby the rotation of the drum in either direction will wind the chain thereon and increase the leverage on the chain as the drum rotates, means for rotating said drum and a brake operating chain secured to said chain connection on said drum, substantially as set forth.

9. In a brake mechanism, the combination of a chain winding drum comprising an eccentric portion of relatively large radius and a concentric portion of smaller radius, said eccentric portion having a connection for a brake chain and corresponding peripheral chain grooves which extend spirally in opposite directions from said chain connection to said concentric portion, whereby the rotation of the drum in either direction will wind the chain thereon and increase the leverage on the chain as the drum rotates, means for rotating said drum, and a brake operating chain secured to said chain connection on said drum, substantially as set forth.

10. In a brake mechanism, the combination of a casing, a chain winding drum journaled therein and adapted to rotate in either direction, said drum having a connection for a brake chain and corresponding peripheral winding portions which decrease in radius in opposite directions from said chain connection whereby the rotation of the drum in either direction will wind the chain thereon and increase the leverage on the chain as the drum rotates, means for rotating said drum, a reversible ratchet wheel adapted to be connected with said drum with its teeth facing in either direction, a holding dog for engaging said ratchet wheel to hold said drum from rotation, said casing being provided with means for pivoting said dog thereon in either of two positions at opposite sides of the axis of said ratchet wheel, a single means for actuating said dog in either of its two positions, and a brake operating chain secured to the chain connection on said drum, substantially as set forth.

11. In a brake mechanism, the combination of a casing, a horizontal operating shaft journaled at its ends in said casing and having an operating handle secured to one end thereof without and adjacent to the outer wall of the casing, a pinion and a clutch connecting said shaft to said pinion within said casing, a chain winding drum journaled within said casing with its axis parallel with said shaft above the floor of the car, said drum having a peripheral winding portion shaped to increase the leverage on the chain as the drum is rotated, a gearing on said drum which is engaged by said pinion within said casing, and a brake operating chain connected to said drum and extending downwardly therefrom for connection with the brakes of the car, substantially as set forth.

12. The combination of a frame, a horizontal winding shaft and a chain winding drum journaled therein side by side above the floor of the car, said shaft and said drum being geared together and being of substantially the same length, said shaft having a vertical operating handle secured thereto adjacent to one end thereof, and said drum having a peripheral winding portion shaped to increase the leverage on the chain as the drum is rotated, and a brake operating chain connected to said drum and extending downwardly therefrom for connection with the brakes of the car, substantially as set forth.

Witness my hand in the presence of two subscribing witnesses.

GRIFFIN S. ACKLEY.

Witnesses:
E. C. HARD,
A. L. McGEE.